(12) United States Patent
Chen et al.

(10) Patent No.: US 8,605,430 B2
(45) Date of Patent: Dec. 10, 2013

(54) MOBILE ELECTRONIC DEVICE

(75) Inventors: Juo-Ti Chen, Taipei (TW); Po-An Lin, Taipei (TW); Kuo-Nan Ling, Taipei (TW); Yung-Hui Chen, Taipei (TW)

(73) Assignee: Compal Electronics, Inc., Taipei (TW)

( * ) Notice: Subject to any disclaimer, the term of this patent is extended or adjusted under 35 U.S.C. 154(b) by 35 days.

(21) Appl. No.: 13/306,997

(22) Filed: Nov. 30, 2011

(65) Prior Publication Data

US 2012/0140410 A1 Jun. 7, 2012

Related U.S. Application Data

(60) Provisional application No. 61/418,882, filed on Dec. 2, 2010.

(51) Int. Cl.
*G06F 1/16* (2006.01)
*G06F 3/02* (2006.01)
*H04M 1/00* (2006.01)

(52) U.S. Cl.
USPC .............. 361/679.55; 361/679.56; 455/575.1; 455/575.4; 345/168; 345/169; 345/905

(58) Field of Classification Search
USPC ............. 361/679.01–679.45, 679.55–679.59; 455/575.1, 575.3, 575.4; 345/156, 157, 345/168, 169, 905
See application file for complete search history.

(56) References Cited

U.S. PATENT DOCUMENTS

| | | | | |
|---|---|---|---|---|
| 8,199,475 B2 * | 6/2012 | Yeh et al. | | 361/679.27 |
| 8,213,163 B2 * | 7/2012 | Wu et al. | | 361/679.01 |
| 8,248,789 B2 * | 8/2012 | Wu et al. | | 361/679.56 |
| 2008/0304215 A1 * | 12/2008 | Chiu | | 361/681 |
| 2010/0118487 A1 * | 5/2010 | Ou et al. | | 361/679.55 |
| 2010/0267428 A1 * | 10/2010 | Wang et al. | | 455/575.4 |
| 2010/0323770 A1 * | 12/2010 | Chuang et al. | | 455/575.4 |

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A mobile electronic device includes a first body, a pivot mechanism and a second body. The pivot mechanism includes a rotating element and a supporting element. The rotating element is connected between the first body and the second body to facilitate rotating the second body relatively to the first body. The rotating element includes a guiding trench connected to the second body, and the second body is suitable for sliding relatively to the first body. The supporting element is pivoted to the rotating element or the second body. When the second body slides to drive the rotating element to a rotating position, the rotating element is rotated relatively to the first body to drive the second body for tilting from the first body, and the supporting element is suitable of rotating relatively to the rotating element or the second body to provide a supporting force to the second body.

8 Claims, 10 Drawing Sheets

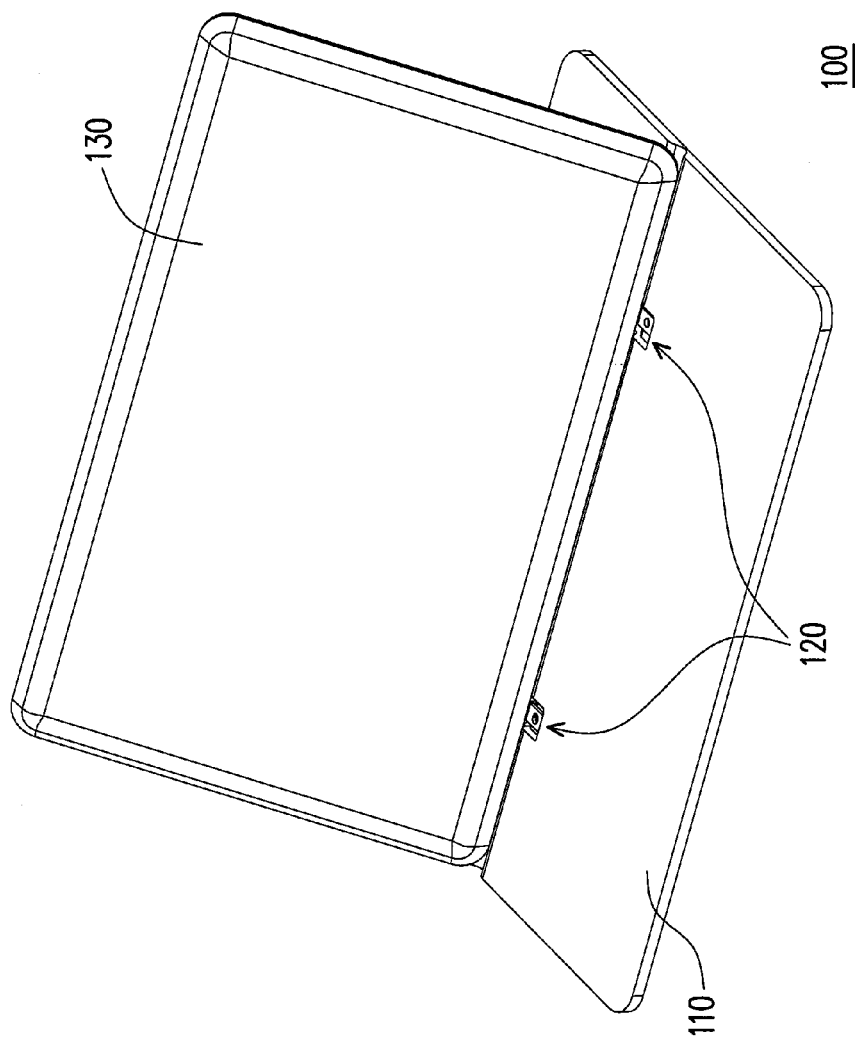

MOBILE ELECTRONIC DEVICE

CROSS-REFERENCE TO RELATED APPLICATION

This application claims the priority benefits of U.S. provisional application Ser. No. 61/418,882, filed on Dec. 2, 2010. The entirety of each of the above-mentioned patent application is hereby incorporated by reference herein and made a part of this specification.

BACKGROUND OF THE INVENTION

1. Field of the Invention

The invention relates to an electronic device. Particularly, the invention relates to a mobile electronic device.

2. Description of Related Art

Along with development of information technology, it becomes easier to obtain required information from electronic devices in daily life. On the other hand, with improvement of processing techniques, various mobile electronic devices are developed to have features of lightness, slimness, shortness and smallness, and due to the characteristic and advantage of portability, the mobile electronic devices are widely applied in daily life.

Taking a mobile phone as an example, in order to achieve portability and meet different preferences and needs, besides a conventional bar-type mobile phone, clamshell, swivel and slide mobile phones are also developed. Taking the slide mobile phone as an example, an upper body and a lower body thereof are stacked and can be slided relative to each other to present different operation modes such as open and close, etc. Stacking of the upper body and the lower body avails reducing a whole volume of the mobile phone, and the upper and lower bodies can be spread under a specific operation mode. For example, in some slide mobile phones, besides the upper and lower bodies can be slided relative to each other, the upper body can be further tilted from the lower body to facilitate a user viewing a display screen on the upper body. Moreover, with development of touch display techniques, a touch display function of the mobile phone gradually replaces a conventional key pressing function, and the user can perform touch operations through the display screen. However, when the user performs the touch operation on the upper body tilted from the lower body, the upper body is probably swayed due to a pressing operation of the user, which is inconvenient in utilization.

SUMMARY OF THE INVENTION

The invention is directed to a mobile electronic device, which has a stable structure to avoid swaying during a touch operation.

The invention provides a pivot mechanism adapted to a mobile electronic device. The pivot mechanism includes a rotating element and a supporting element. The rotating element is connected to a first body and a second body. The supporting element is pivoted to the rotating element and is suitable for rotating relative to the rotting element, where when the second body is rotated relative to the first body through the rotating element and is tilted from the first body, the supporting element provides a supporting force to the second body.

The invention provides a mobile electronic device including a first body, a second body and a pivot mechanism. The second body includes a sliding rail, and the pivot mechanism includes a rotating element and a supporting element. The rotating element includes a guiding trench for connecting the second body, and the rotating element is connected between the first body and the second body such that the second body is suitable for rotating and sliding relatively to the first body. The supporting element is located at a side of the second body, and when the second body is rotated relative to the first body through the rotating element and is tilted from the first body, the supporting element provides a supporting force to the second body.

The invention provides an actuation method of a mobile electronic device. First, a first force is applied to a second body to slide the second body relative to a first body, where the second body slides relative to the first body through a guiding trench. A second force is applied to the second body to rotate the second body relative to the first body through a rotating element in a pivot mechanism, where when the rotating element is rotated, a supporting element in the pivot mechanism provides a supporting force to the second body.

In an embodiment of the invention, the first body connected to the rotating element includes a groove for accommodating the rotating element, where when the rotating element is located in the groove, the second body covers a part of the first body or the second body slides relative to the first body.

In an embodiment of the invention, the supporting element has a pivot end and a supporting end, and the supporting element is pivoted to the rotating element through the pivot end, where the first body includes a sliding trench to facilitate a protrusion pillar on the supporting element sliding in the sliding trench.

In an embodiment of the invention, the first body connected to the rotating element includes a groove for accommodating the rotating element, and the sliding trench is located on a sidewall of the groove.

In an embodiment of the invention, the sliding trench on the first body connected to the rotating element includes a stop end, and when the supporting element provides the supporting force to the second body, the protrusion pillar leans against the stop end.

In an embodiment of the invention, the rotating element includes an accommodating slot for accommodating the supporting element.

In an embodiment of the invention, the pivot mechanism further includes a first elastic element, and the first elastic element is located between the rotating element and the supporting element to automatically rotate the supporting element relative to the rotating element.

In an embodiment of the invention, the first elastic element is a torsion spring.

In an embodiment of the invention, the first body has a second elastic element, and the second elastic element is located at a bottom of the groove for contacting the supporting element.

In an embodiment of the invention, the second elastic element is a spring leaf or a plate spring.

In an embodiment of the invention, the second body includes a touch interface and a display.

In an embodiment of the invention, the rotating element is connected to the first body through a hinge to facilitate the second body rotating relative to the first body.

In an embodiment of the invention, the rotating element includes a guiding trench and the rotating element is connected to a sliding rail of the second body through the guiding trench, so as to connect the rotating element to the second body.

In an embodiment of the invention, the second body connected to the rotating element slides in the guiding trench through the sliding rail such that the second body slides relative to the first body.

In an embodiment of the invention, when a force is applied on the second body connected to the rotating element, the force is transmitted to the guiding trench through the sliding rail to drive the rotating element to rotate relative to the first body.

In an embodiment of the invention, the supporting element is connected to the rotating element or the second body.

In an embodiment of the invention, when the supporting element is connected to the rotating element, a connection position of the supporting element and the rotating element is adjacent to a position where the rotating element is connected to the second body.

In an embodiment of the invention, the first body is a host or a docking.

In an embodiment of the invention, the first body includes an input device, where the input device comprises a keyboard.

In an embodiment of the invention, the second body includes a display, and the display includes a display area.

In an embodiment of the invention, the second body includes a touch area and the supporting force is used to support the second body when the touch area receives a touch operation.

In an embodiment of the invention, an angle between the supporting element and a plane of the touch area is less than 90 degree when the second body is rotated relative to the first body through the rotating element and the supporting element is used to provide the supporting force to the second body.

According to the above descriptions, the pivot mechanism has the supporting element pivoted to the rotating element, and after the second body is tilted from the first body through a pivot rotation of the rotating element, the supporting element is suitable for pivotally rotating relative to the rotating element to lean against the first body, so as to stably support the rotating element and the second body. In this way, when the user presses the second body to perform the touch operation, the second body can be supported by the supporting element to reduce a chance of sway, so that the mobile electronic device may have good operability. Moreover, the elastic element can be configured between the rotating element and the supporting element, so that the supporting element is adapted to be automatically popped up from the rotating element through an elastic force of the elastic element, so as to facilitate the operation of the user.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A-1C are diagrams illustrating an actuation of a mobile electronic device according to an embodiment of the invention.

DETAILED DESCRIPTION OF DISCLOSED EMBODIMENTS

Figure 1A:
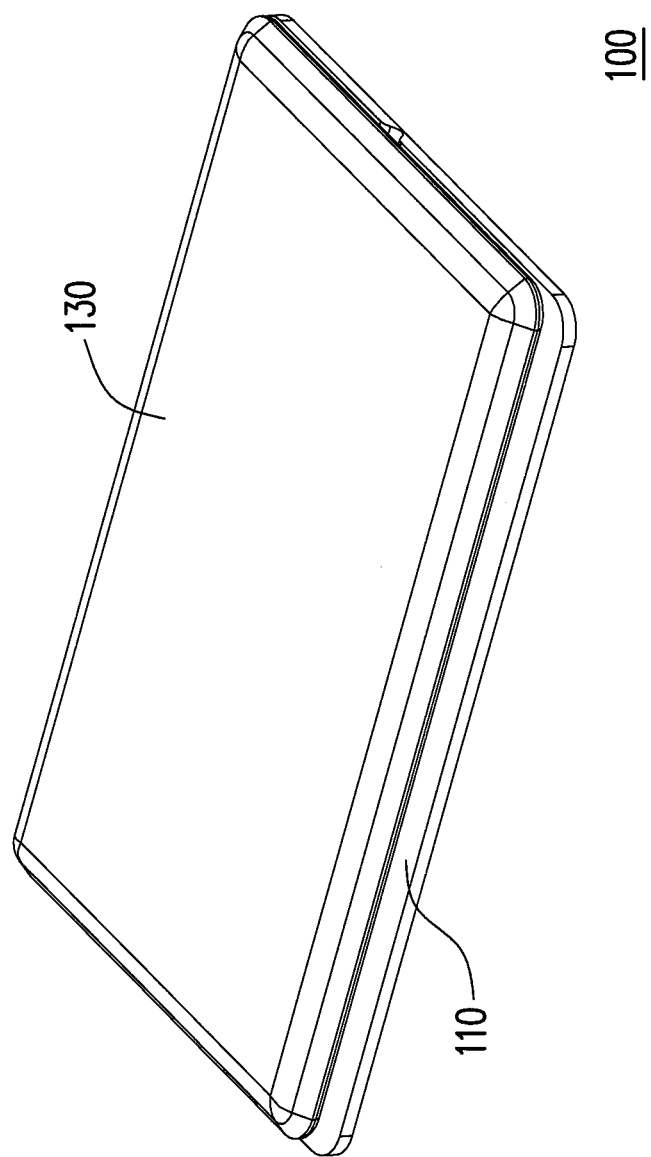
Figure 1B:
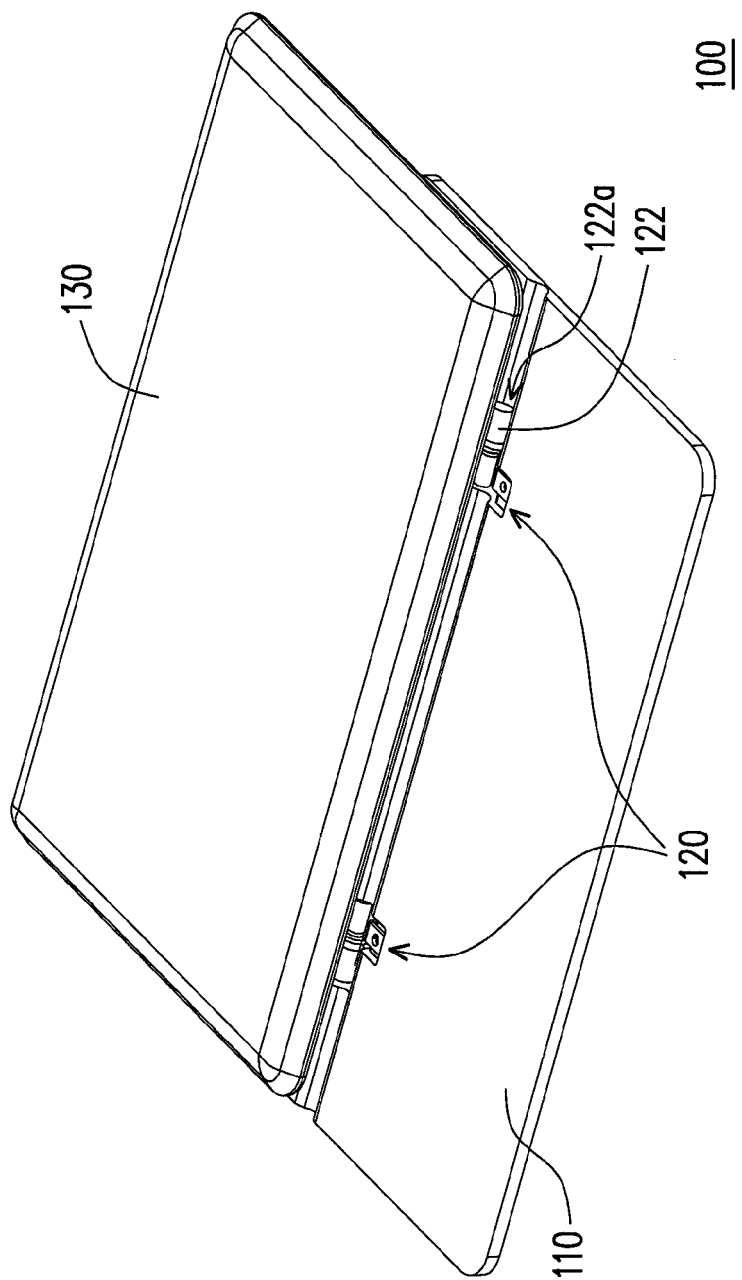

FIGS. 1A-1C are diagrams illustrating an actuation of a mobile electronic device according to an embodiment of the invention. Referring to FIGS. 1A-1C, the mobile electronic device 100 of the present embodiment includes a first body 110, a pivot mechanism 120 (two pivot mechanisms are illustrated) and a second body 130. The pivot mechanism 120 is connected between the first body 110 and the second body 130. The second body 130 is adapted to cover a part of the first body 110 and exposes another part of the first body 110 as that shown in FIG. 1A. The second body 130 can be slided relative to the first body 110 from a state shown in FIG. 1A to a state shown in FIG. 1B, and is rotated relative to the first body 110 to a state shown in FIG. 1C. The second body 130 includes a touch interface for controlling a display on the second body 130. The mobile electronic device 100 of the present embodiment is, for example, a mobile phone or a tablet PC, and the first body 110 and the second body 130 are, for example, respectively a host and a touch display or a docking and a tablet PC, though the invention is not limited thereto. According to different product designs, if the first body 110 is the docking, it may further include an input device, and the input device can be a keyboard. Generally, the second body 130 includes a display and a touch area to facilitate a user viewing and operating the second body 130, where the touch area and a display area can be combined to form a touch display screen. The user can perform a touch operation on the second body 130 when the mobile electronic device 100 is in the state shown in FIG. 1C. Composition and actuation of the pivot mechanism 120 are introduced in detail with reference of figures. An angle (not shown in figures) between the supporting element 124 (shown in FIG. 3) and a plane of the touch area is less than 90 degree when the second body 130 is rotated relative to the first body 120 through the rotating element 122 and the supporting element 124 is used to provide a supporting force to the second body 130.

Figure 2:
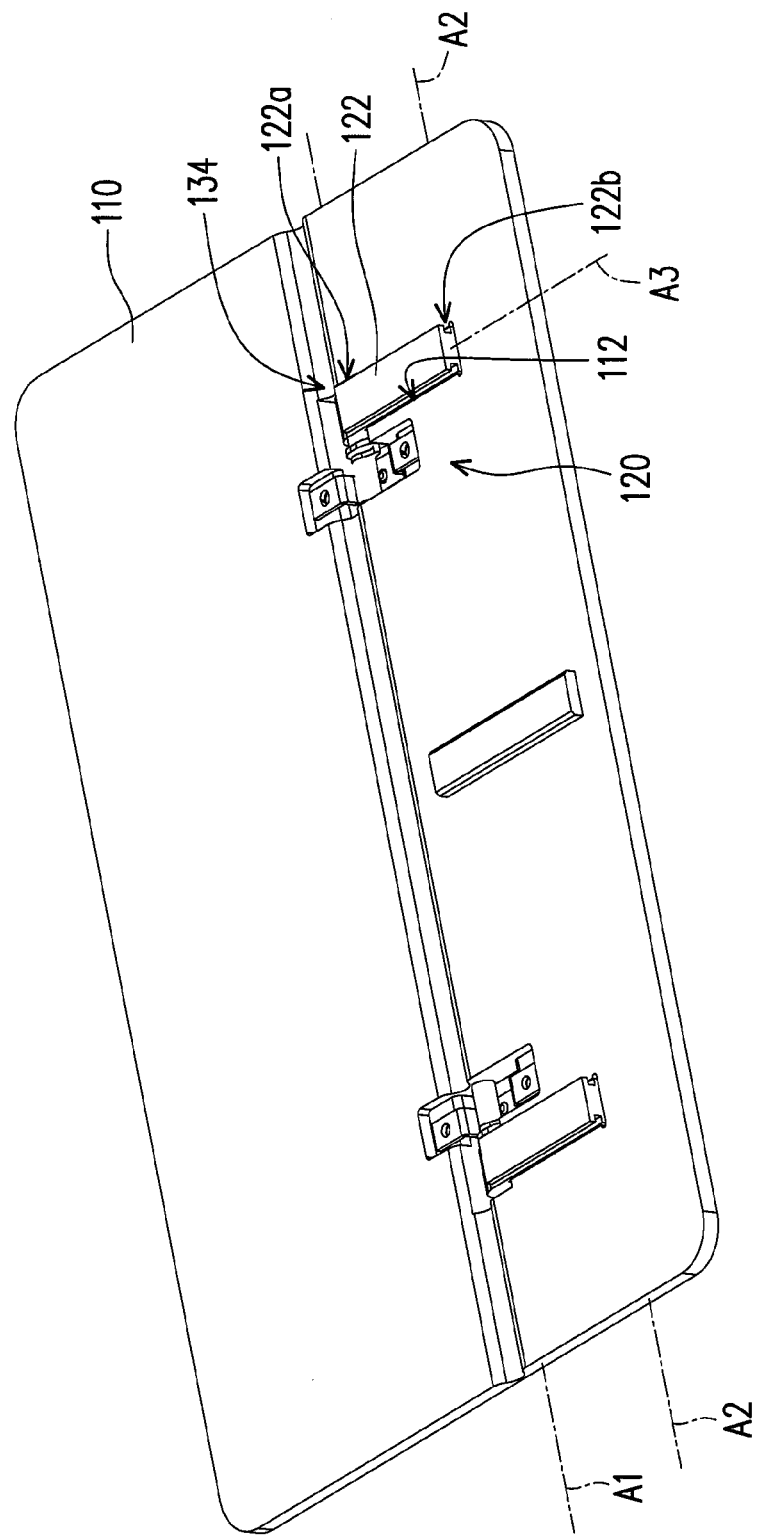
FIG. 2 is a three-dimensional view of a part of components of the mobile electronic device of FIG. 1A.
Figure 3:
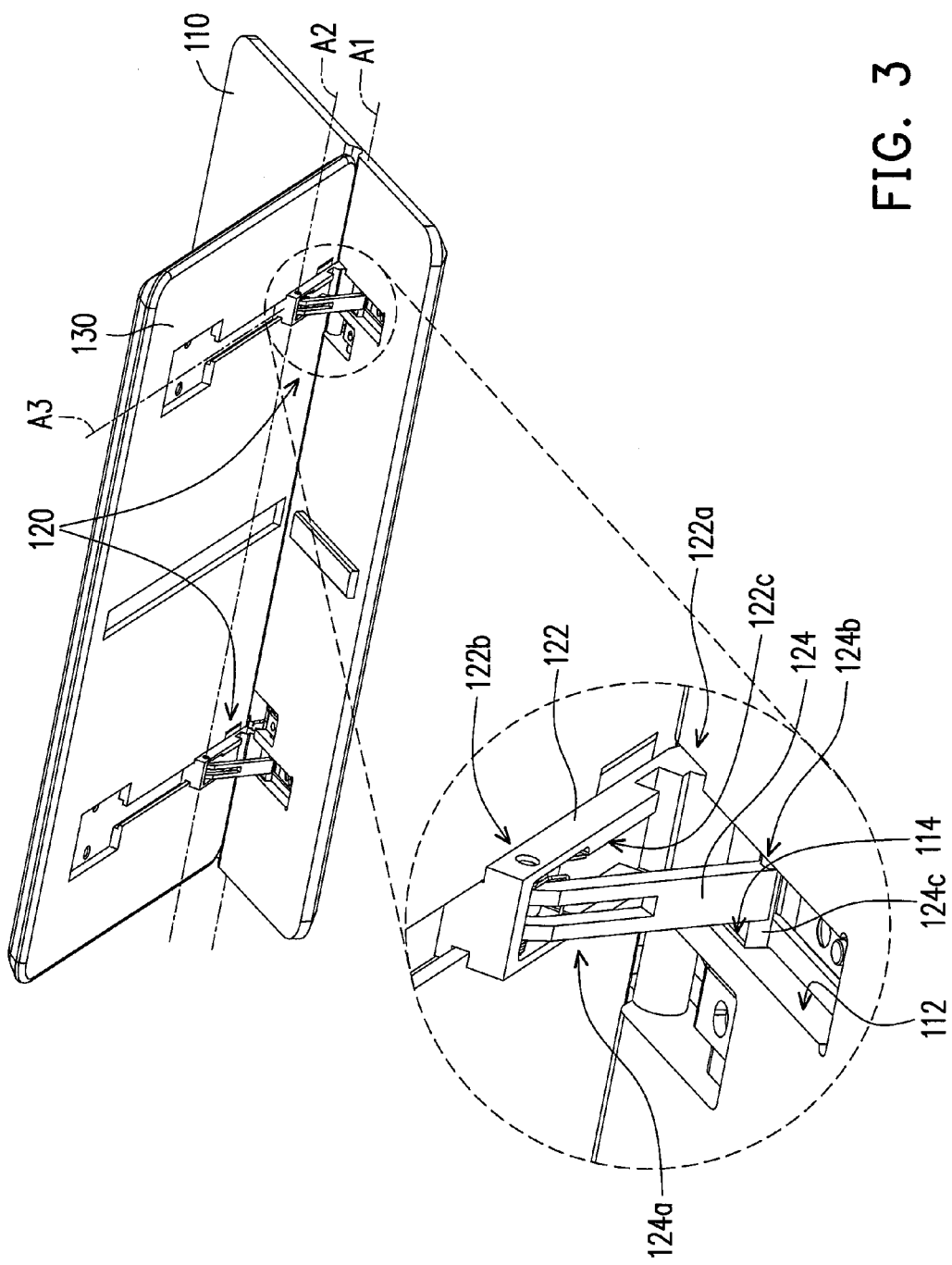
FIG. 3 is a three-dimensional view of the mobile electronic device of FIG. 1C viewed from another viewing angle.
Figure 4:
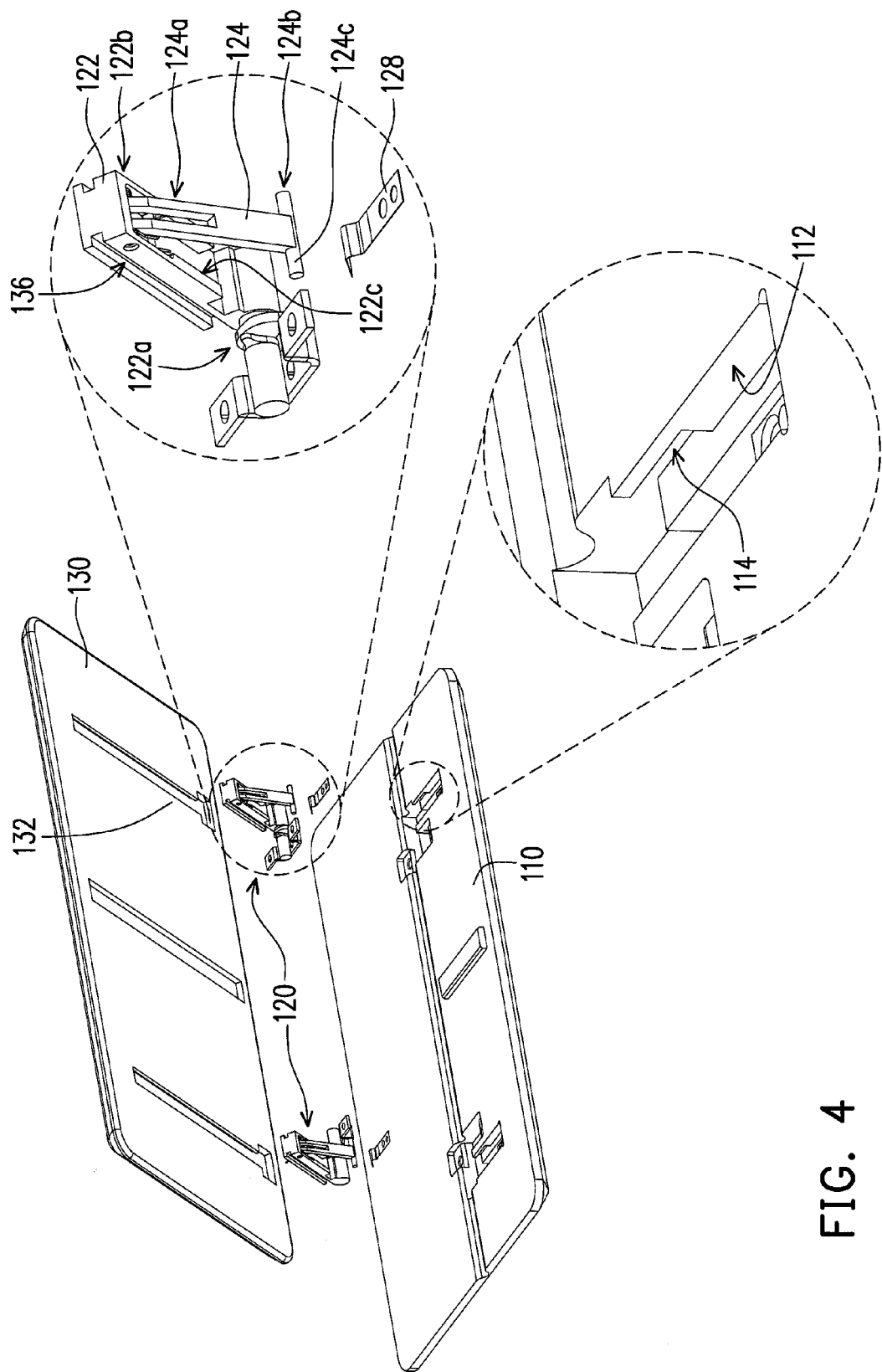
FIG. 4 is an exploded view of the mobile electronic device of FIG. 3.

FIG. 2 is a three-dimensional view of a part of components of the mobile electronic device of FIG. 1A. FIG. 3 is a three-dimensional view of the mobile electronic device of FIG. 1C viewed from another viewing angle. FIG. 4 is an exploded view of the mobile electronic device of FIG. 3. Referring to FIG. 2 to FIG. 4, the pivot mechanism 120 of the present embodiment includes a rotating element 122 and a supporting element 124. A first end 122a of the rotating element 122 is pivoted to the first body 110 along a first axial line A1. The supporting element 124 has a pivot end 124a and a supporting end 124b, and the pivot end 124a is pivoted to a second end 122b of the rotating element 122 along a second axial line A2 parallel to the first axial line A1. The second body 130 is slidably connected to the rotating element 122 along a third axial line A3 perpendicular to the first axial line A1. The second axial line A2 and the third axial line A3 are fixed to the rotating element 122, and are rotated along with the rotating element 122 relative to the first axial line A1.

The second body 130 includes a sliding rail 132, and when the rotating element 122 slides in the sliding rail 132 through a guiding trench 136 on a sidewall of the rotating element 122, the second body 130 slides relative to the first body 110 (shown in FIG. 1B). Along with different product designs, the sliding rail 132 can also be designed on the rotating element 122, and meanwhile the guiding trench 136 is designed on the second body 130, though the invention is not limited thereto. One end of the sliding rail 132 has a rotating position 134 and the rotating position 134 provides an enough rotation space for the rotating element 122 of the second body 130 to rotate relative to the first body 110. When the rotating element 122 is located other positions of the sliding rail 132, the second body 130 is position-limited by the first body 110, and cannot rotate relative to the first body 110. When the rotating element 122 slides in the sliding rail 132 to the rotating position 134, and the second body 130 is driven by an external force to rotate through the rotating element 122, the second body 130 can transmit the force to the rotating element 122 through the guiding trench 136 engaged to the sliding rail 132, so as to rotate one end of the rotating element 122. The rotating element 122 is adapted to pivotally rotate relative to the first body 110 to drive the second body 130 to tilt from the first body 110 as that shown in FIG. 1C. When the second body 130 is tilted from the first body 110, the supporting end 124b of the supporting element 124 is adapted to lean against the first body 110 along with pivot rotation of the pivot end 124a relative to the rotating part 122, as that shown in FIG. 3, so that the supporting element 124 is supported between the first body 110 and the second body 130 to stably support the rotated second body 130. A main function of the supporting element 124 is to provide a supporting force to the second body 130, so that along with different product designs, the supporting element 124 can also be supported between the second body 130 and an object to provide the supporting force to the second body 130, and the object can be a plane carrying the first body 110, for example, a desk surface or a chair surface. In this way, when the user presses the second body 130 to perform the touch operation, a chance of swaying the second body 130 can be reduced due to support of the supporting element 134.

Referring to FIG. 2 to FIG. 4, in detail, the first body 110 of the present embodiment has a groove 112. When the rotating element 122 is embedded in the groove 112, the second body 130 is suitable for covering a part of the first body 110 as that shown in FIG. 1 or sliding relative to the first body 110 along the rotating element 122. A main reason that the second body 130 does not totally cover the first body 110 is to preserve a part of space of the first body 110 to facilitate the user exerting a force to the second body 130, so that when the user exerts a force to the second body 130, the second body 130 can fluently slide relative to the first body 110. When the rotating element 122 is pivotally rotated relative to the first body 110 to depart from the groove 112, the second body 130 is driven to be tilted from the first body 110. Moreover, the rotating element 122 of the present embodiment has an accommodating slot 122c, and the supporting element 124 is suitable to be embedded in the accommodating slot 122c, and is suitable for pivotally rotating relative to the rotating element 122 to depart from the accommodating slot 122c and support between the first body 110 and the second body 130. In order to reduce a thickness of the mobile electronic device 100, the accommodating slot 122c of the supporting element 124 can be disposed in the rotating element 122, so as to hide the supporting element 124 without influencing a structural strength of the rotating element 122. When the mobile electronic device 100 is in a state shown in FIG. 1A or FIG. 1B, the groove 112 and the accommodating groove 122c respectively provide spaces for accommodating the rotating element 122 and the supporting element 124. Along with different product designs, the supporting element 124 can be directly pivoted to the second body 130 instead of being pivoted to the rotating element 122, so as to provide the supporting force for the second body 130 after the first body 110 and the second body 130 are relatively rotated through the rotating element 122. Now, the accommodating slot 122c is directly configured on the second body 130.

Figure 5:
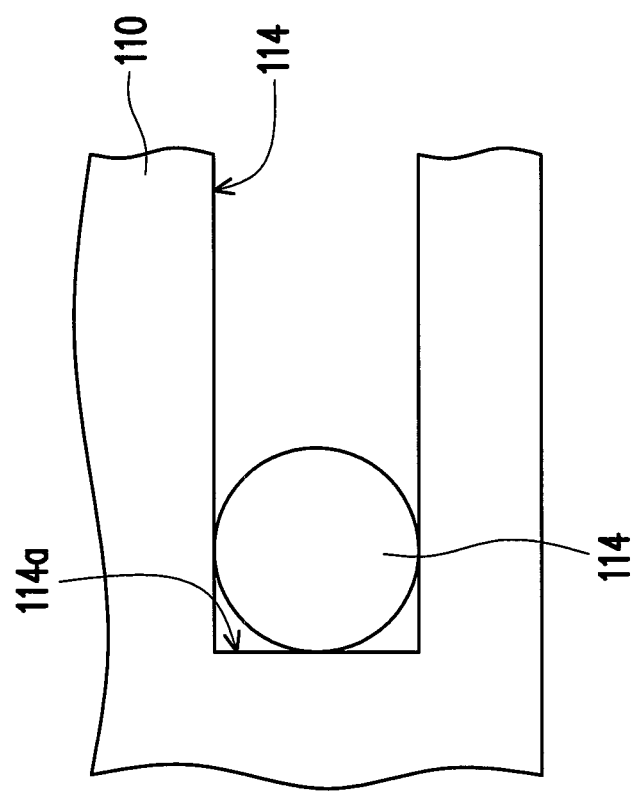
FIG. 5 is a schematic diagram of a protrusion pillar of FIG. 3 sliding in a sliding trench.

Referring to FIG. 3 and FIG. 4, the first body 110 of the present embodiment has a sliding trench 114, and the supporting end 124b of the supporting element 124 has a protrusion pillar 124c, where the sliding trench 114 is located at the sidewall of the groove 112. The protrusion pillar 124c is adapted to be slid into the sliding trench 114 along with a pivot rotation of the pivot end 124a relative to the rotating element 122, so that the supporting end 124b can stably slide along the first body 110. FIG. 5 is a schematic diagram of a protrusion pillar of FIG. 3 sliding in a sliding trench. Referring to FIG. 5, in the present embodiment, the sliding trench 114 has a stop end 114a. The protrusion pillar 124c is adapted to slide along the sliding trench 114 and leans against the stop end 114a, so that the supporting element 124 can stably support between the first body 110 and the second body 130.

Figure 6:
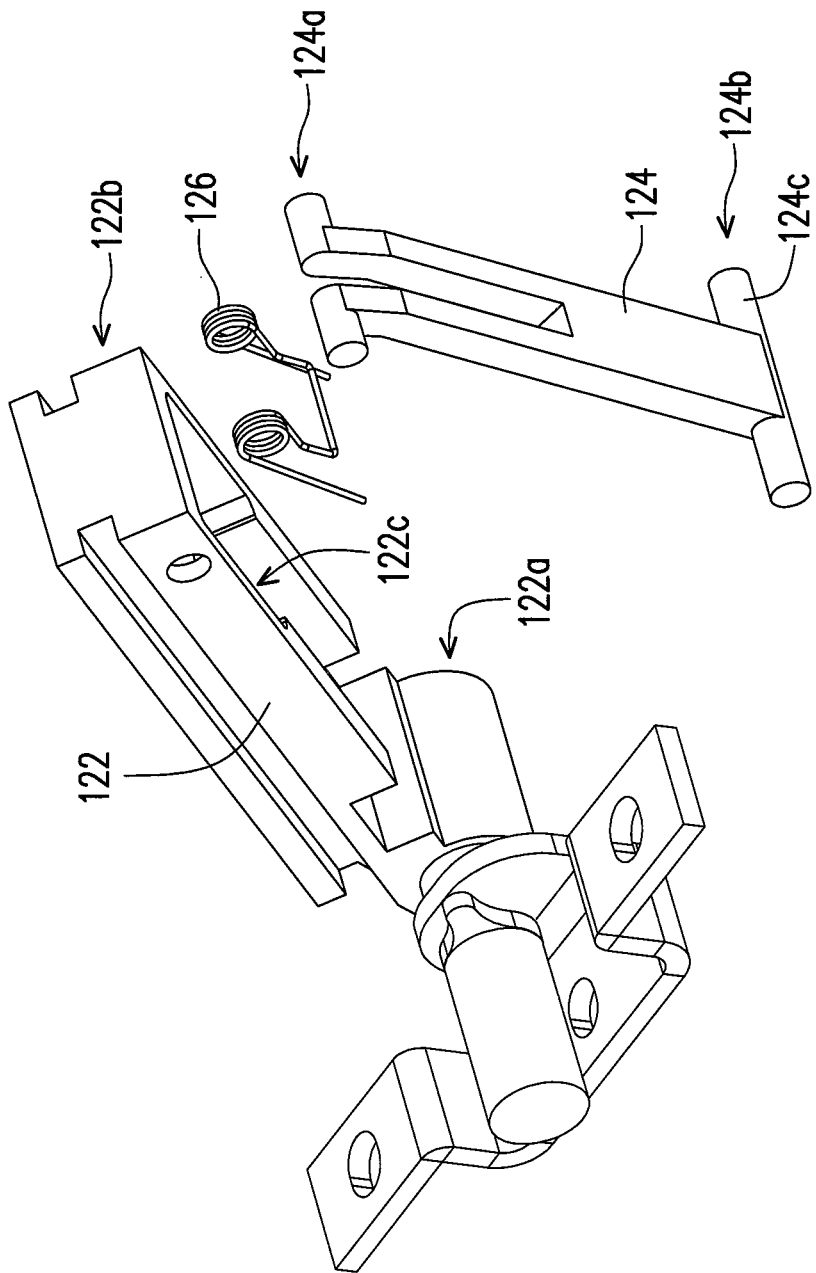
FIG. 6 is an exploded view of a part of components of a pivot mechanism of FIG. 1.

FIG. 6 is an exploded view of a part of components of the pivot mechanism of FIG. 1. Referring to FIG. 6, the pivot mechanism 120 of the present embodiment further includes an elastic element 126. The elastic element 126 is, for example, a torsion spring and is connected between the rotating element 122 and the supporting element 124. When the second body 130 is tilted from the first body 110, the supporting element 124 is pivotally rotated relative to the rotating element 122 through an elastic force of the elastic element 126, and is supported between the first body 110 and the second body 130 as that shown in FIG. 3. In detail, when the mobile electronic device 100 is in the state shown in FIG. 1A or FIG. 1B, the supporting element 124 is position-limited, and cannot be released from the accommodating slot 122c (marked in FIG. 3 and FIG. 4), and now the elastic element 126 stores an elastic potential. After the user adjusts the second body 130 to be tilted from the first body 110 according to a flow shown in FIGS. 1A-1C, the supporting element 124 is no longer position-limited and is popped up to a position shown in FIG. 3 through the elastic force of the elastic element 126. When the supporting element 124 is pivoted to the second body 130, the elastic element 126 is disposed between the supporting element 124 and the second body 130, so that when the second body 130 is rotated relative to the first body 110, the supporting element 124 can be automatically popped up by the elastic element 126 to support the second body 130.

Figure 7:
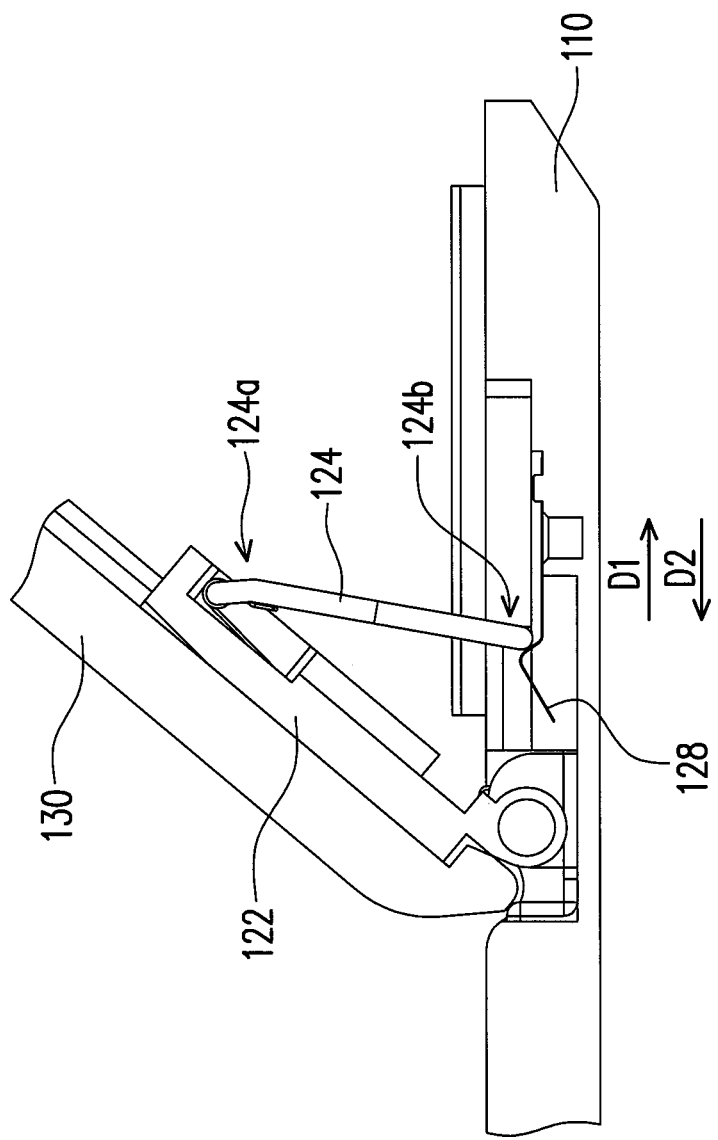
FIG. 7 is a partial cross-sectional view of the mobile electronic device of FIG. 3.

FIG. 7 is a partial cross-sectional view of the mobile electronic device of FIG. 3. Referring to FIG. 4 and FIG. 7, the pivot mechanism 120 of the present embodiment further includes an elastic element 128. The elastic element 128 is disposed at the bottom of the groove 112 and is connected to the first body 110, and is located on a moving path of the supporting end 124b on the first body 110, where the elastic element 128 can be a spring leaf or a plate spring, and a material thereof can be metal or plastic. When the supporting element 124 is pivotally rotated relative to the rotating element 122 to drive the supporting end 124b to move relative to the first body 110 along a direction D1 or a direction D2, the supporting end 124b resists the elastic force of the elastic element 128 to pass over the elastic element 128, so as to increase an operating sense of the user.

Figure 8:
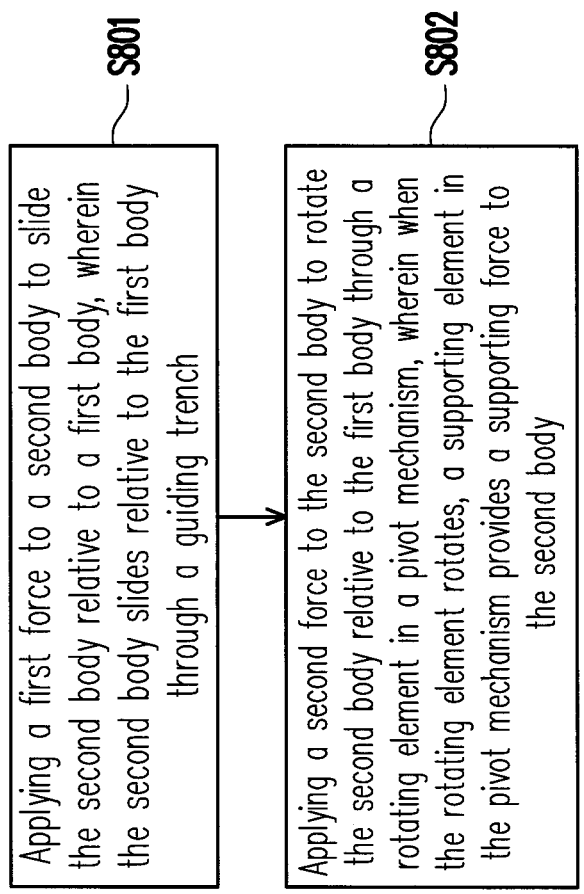
FIG. 8 is a flowchart illustrating an actuation method of a mobile electronic device according to an embodiment of the invention.

FIG. 8 is a flowchart illustrating an actuation method of a mobile electronic device according to an embodiment of the invention. First, a first force is applied to a second body to slide the second body relative to a first body, where the second body slides relative to the first body through a guiding trench (S801). The first body is connected to the second body through a rotating element on a pivot mechanism, and the rotating element is connected to the second body through the guiding trench such that the second body is capable of sliding relative to the first body. The second body generally has a display and the display has a display area. A direction of the first force is perpendicular to a normal line direction of the display area on the second body, so that the second body can be slided relative to the first body. Then, a second force is applied to the second body to rotate the second body relative to the first body through the rotating element in the pivot mechanism, where when the rotating element is rotated, a supporting element in the pivot mechanism provides a supporting force to the second body (S802). After the second body is rotated relative to the first body to present a tilt state, the supporting element of the pivot structure provide the supporting force to the second body, so that the second body is not drastically swayed when the touch area on the second body receives a touch operation. Generally, a direction of a part of the second force is parallel to the normal line direction of the display area on the second body to resist a minimum torque of the rotating element relative to the first body, so as to rotate the second body relative to the first body.

In summary, the pivot mechanism has the supporting element pivoted to the rotating element, and after the second body is tilted from the first body through a pivot rotation of the rotating element, the supporting element is suitable for pivotally rotating relative to the rotating element to lean against the first body, so as to stably support the rotating element and the second body. In this way, when the user presses the second body to perform the touch operation, the second body can be supported by the supporting element to reduce a chance of sway, so that the mobile electronic device may have good operability. Moreover, the elastic element can be configured between the rotating element and the supporting element, so that the supporting element is adapted to be automatically popped up from the rotating element through an elastic force of the elastic element, so as to facilitate the operation of the user.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A mobile electronic device, comprising: a first body; a second body; a pivot mechanism, comprising a rotating element and a supporting element, wherein the rotating element is connected between the first body and the second body such that the second body is suitable for rotating and sliding relatively to the first body, and the supporting element is located at a side of the second body to provide a supporting force to the second body when the second body is rotated relative to the first body through the rotating element, wherein the rotating element comprises an accommodating slot for accommodating the whole of the supporting element; wherein the pivot mechanism further comprises a first elastic element, and the first elastic element is located between the rotating element and the supporting element or between the rotating element and the second body to automatically rotate the supporting element relative to the rotating element.

2. The mobile electronic device as claimed in claim 1, wherein the supporting element is connected to the rotating element or the second body.

3. The mobile electronic device as claimed in claim 1, wherein the supporting element has a pivot end and a supporting end, and the supporting element is pivoted to the rotating element through the pivot end, wherein the first body comprises a sliding trench to facilitate a protrusion pillar on the supporting element sliding in the sliding trench.

4. The mobile electronic device as claimed in claim 3, wherein the sliding trench on the first body comprises a stop end, and when the supporting element provides the supporting force to the second body, the protrusion pillar leans against the stop end.

5. The mobile electronic device as claimed in claim 1, wherein the first body has a second elastic element, and the second elastic element is located at a bottom of a groove of the first body for contacting the supporting element.

6. The mobile electronic device as claimed in claim 5, wherein one end of the supporting element is capable of moving relative to the first body, and the second elastic element is located on a moving path of the end of the supporting element.

7. The mobile electronic device as claimed in claim 1, wherein the second body comprises a touch area and the supporting force is used to support the second body when the touch area receives a touch operation.

8. The mobile electronic device as claimed in claim 7, wherein an angle between the supporting element and a plane of the touch area is less than 90 degree when the second body is rotated relative to the first body through the rotating element and the supporting element is used to provide the supporting force to the second body.

* * * * *